United States Patent Office 3,081,534
Patented Mar. 19, 1963

3,081,534
ALUMINUM BASE BRAZING ALLOY
Nikolajs T. Bredzs, Chicago, Ill., assignor to Armour Research Foundation of Illinois Institute of Technology, Chicago, Ill., a not-for-profit Illinois corporation
No Drawing. Filed Nov. 18, 1960, Ser. No. 70,127
4 Claims. (Cl. 29—494)

The present invention relates to an alumnium-silicon-lithium alloy, with the optional alloying metal copper, which is of particular utility in the fluxless brazing or soldering of aluminum.

The problems involved in the brazing of aluminum are somewhat unique when compared with the brazing of copper, brass, steel and most other common metals. The most important difference stems from the fact that aluminum has formed thereon a most tenacious refractory oxide. It is such oxide film or coating which has necessitated the use of highly active and corrosive alkali fluxes that have been specifically designed for the brazing of aluminum. As is well known to those skilled in this particular art, such fluxes, as well as the residues thereof, after brazing when in aqueous solution markedly attack aluminum. Furthermore, such residues tend to be hygroscopic. Thus, these known fluxes and their residues considerably impair the corrosion of the brazed aluminum joints.

In distinction to the difficulties encountered when aluminum is brazed as previously taught, by employing the self-fluxing alloys of the present invention, corrosion-resistant brazing of aluminum is readily accomplished.

Accordingly, a primary object of my invention is to provide an aluminum-silicon-lithium alloy, with the optional alloying metal copper, which is useful in the fluxless brazing of aluminum.

Other objects, features and advantages of my invention will become apparent to those skilled in this particular art from the following detailed disclosure thereof.

I have discovered that alloys consisting essentially of from 4.9% to 10% silicon, 0 to 4% copper, 0.1% to 1% lithium, balance aluminum (all such percentages being by weight) provide excellent results in the brazing of aluminum. In selecting a particular composition within such range, if it is to be used for aluminum bonding, such composition should melt at a lower temperature than aluminum. Within such alloying range especially good results have been obtained with the compositions Al—5% Si—1% Li an Al—10% Si—4% Cu—1% Li, such compositions representing the preferred embodiments hereof with and without copper being present therein.

The present alloys, as noted above, are useful in the brazing of aluminum, and by their use such processes may be carried out in air without a flux being necessary. Such alloys may thus be considered as "self-fluxing."

These alloys were prepared from metal powder constituents which were first well blended and then melted in a magnesia crucible maintained in a dry argon atmosphere. Representative alloys of the group had the following melting points:

94% Al—5% Si—1% Li _____ 577° to 629° C.
85% Al—10% Si—4% Cu—1% Li ___ 570° to 679° C.

Following melting of the alloys, the samples were cold rolled and cut into thin shims for brazing use.

After the alloys were prepared, the wettability thereof upon aluminum was next determined. A one gram pellet of each alloy was placed on the center of a 1 x 1 x ⅛ inch coupon of commercial 1100 aluminum sheet and heated to about 630° C. under one of the following environmental conditions:

(a) High vacuum (0.1 micron or less)
(b) Dry argon
(c) Air

No wettability could be discerned on the samples heated in vacuum or dry argon. The pellets were encapsulated in a solid, dark gray crust of presumably lithium oxide and showed no signs of flowing on the aluminum surface.

On the other hand, when such pellets were melted in air, remarkably good wetting and bonding to the aluminum occurred. The solidified pellet material appeared to be free from the oxide crust.

From these and other experiments, the user of the present alloys for aluminum bonding is cautioned to carry out such process either in the presence of moisture-bearing air or at least an atmosphere which makes possible the formation of lithium hydroxide. While I am not absolutely certain of the theoretical considerations which give rise to such requirement, it is noted that molten LiOH can dissolve practically every known metal oxide, and particularly that of aluminum. Lithium hydroxide is quite stable, does not decompose and is liquid in the temperature range 450° to 924° C. which is useful in working with aluminum. When the lithium bearing alloys comprising my present invention are heated in a moisture-containing atmosphere, part of the lithium is converted to lithium hydroxide. Such conversion serves a dual function: the LiOH protects underlying lithium from further oxidation thereby leaving such metal for subsequent reduction of aluminum oxide while at the same time dissolving a portion of said $Al_2O_3$ to assist in the formation of a good bond.

The utility of the desirable new alloys made in accord herewith may best be observed by reference to the following table:

TABLE I

Shear Strength of Lap Joints Brazed Without Flux in Air

[Base metal: 1100 aluminum]

| Composition of the Filler Metal | Specimen No. | Fracture Load, lb. | Area, in.² | Shear Strength, lb./in.² | Remarks |
|---|---|---|---|---|---|
| 85% Al—10% Si—4% Cu—1% Li. | 1 | 1,682 | 1.00 | 1,682 | Broke in base metal. |
| | 2 | 1,108 | 1.00 | 1,108 | Broke in filler metal. |
| | 3 | 1,630 | 1.00 | 1,630 | Broke in base metal. |
| 94.5% Al—4.9% Si—1% Li. | 1 | 182 | ? | ? | Broke along interface. |
| | 2 | 106 | ? | ? | Do. |
| | 3 | 754 | 0.75 | 1,005 | Do. |

For the tests reported in the foregoing table 5 x 1 x ⅛ inch strips of 1100 aluminum were used. Cold rolled filler metal shims were interposed between such strips and the assembly torch brazed in air. By such procedure the sandwich-like assembly was heated to about 630° C. while moderate pressing of the two strips was maintained. The latter served to squeeze out excess filler metal and to provide good contact. Upon cooling and solidification, it was observed that such air-brazed joints were so strong that fracture occurred primarily in the base metal.

With the foregoing disclosure available, it will be understood that various modifications may be effected without departing from the spirit and scope of the novel concepts of my invention.

I claim as my invention:

1. An alloy consisting essentially of 10% silicon, 4% copper, 1% lithium, balance aluminum.

2. The method of the fluxless joining of aluminum which comprises the steps of: making an alloy consisting essentially of from 4.9 percent to 10 percent silicon, 0 to 4 percent copper, 0.1 percent to 1 percent lithium, balance aluminum; fabricating said alloy composition into a foil member; contacting said foil member intermediate the aluminum surfaces to be joined; heating said foil in contact with said aluminum to above the melting point of said foil in a moisture-bearing atmosphere and then permitting said melted foil to cool and solidify.

3. The method of the fluxless joining of aluminum which comprises the steps of: making an alloy consisting essentially of 5 percent silicon, 1 percent lithium, balance aluminum; fabricating said alloy composition into a foil member; contacting said foil member intermediate the aluminum surfaces to be joined; heating said foil in contact with said aluminum to above the melting point of said foil in a moisture-bearing atmosphere and then permitting said melted foil to cool and solidify.

4. The method of the fluxless joining of aluminum which comprises the steps of: making an alloy consisting essentially of 10 percent silicon, 4 percent copper, 1 percent lithium, balance aluminum; fabricating said alloy composition into a foil member; contacting said foil member intermediate the aluminum surfaces to be joined; heating said foil in contact with said aluminum to above the melting point of said foil in a moisture-bearing atmosphere and then permitting said melted foil to cool and solidify.

References Cited in the file of this patent

FOREIGN PATENTS

| | | |
|---|---|---|
| 374,370 | Great Britain | June 9, 1932 |
| 629,048 | Great Britain | Sept. 9, 1949 |